United States Patent
Bhardwaj et al.

(10) Patent No.: US 9,383,209 B2
(45) Date of Patent: Jul. 5, 2016

(54) UNDOCKING AND RE-DOCKING MOBILE DEVICE INERTIAL MEASUREMENT UNIT FROM VEHICLE

(71) Applicant: Texas Instruments Incorporated, Dallas, TX (US)

(72) Inventors: Sachin Bhardwaj, Bangalore (IN); Sriram Murali, Bangalore (IN); Jaiganesh Balakrishnan, Bangalore (IN); Jayawardan Janardhanan, Bangalore (IN); Yogesh Shekar, Bangalore (IN); Goutam Dutta, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 141 days.

(21) Appl. No.: 14/034,486

(22) Filed: Sep. 23, 2013

(65) Prior Publication Data

US 2015/0088419 A1    Mar. 26, 2015

(51) Int. Cl.
*G01C 21/16* (2006.01)
*G01C 21/20* (2006.01)

(52) U.S. Cl.
CPC .............. *G01C 21/165* (2013.01); *G01C 21/16* (2013.01); *G01C 21/20* (2013.01)

(58) Field of Classification Search
CPC ....... G01C 21/165; G01C 21/16; G01C 21/20
USPC ................................................... 701/472, 500
See application file for complete search history.

(56) References Cited

U.S. PATENT DOCUMENTS

| | | | |
|---|---|---|---|
| 8,306,273 B1* | 11/2012 | Gravseth et al. ............... | 382/106 |
| 2008/0234935 A1* | 9/2008 | Wolf et al. ..................... | 701/216 |
| 2009/0254294 A1* | 10/2009 | Dutta .............................. | 702/92 |
| 2010/0010741 A1* | 1/2010 | Tener et al. .................... | 701/220 |
| 2012/0086598 A1* | 4/2012 | Aghili ........................ | 342/357.25 |
| 2012/0320195 A1* | 12/2012 | Tener et al. ................... | 348/139 |

* cited by examiner

*Primary Examiner* — James Trammell
*Assistant Examiner* — Majdi Alsomiri
(74) *Attorney, Agent, or Firm* — Larence J. Bassuk; Frank D. Cimino

(57) ABSTRACT

According to an aspect of the present disclosure, the relative attitude between an inertial measurement unit (IMU), present on a mobile device, and the frame of reference of the vehicle carrying mobile device is estimated. The estimated relative attitude is used to translate the IMU measurement to the vehicle frame of reference to determine the velocity and position of the vehicle. As a result, the vehicle position and velocity are determined accurately in the event of undocking and re-docking of the mobile device from a docking system in the vehicle. The relative attitude is estimated in terms of pitch, roll, and yaw angles.

15 Claims, 5 Drawing Sheets

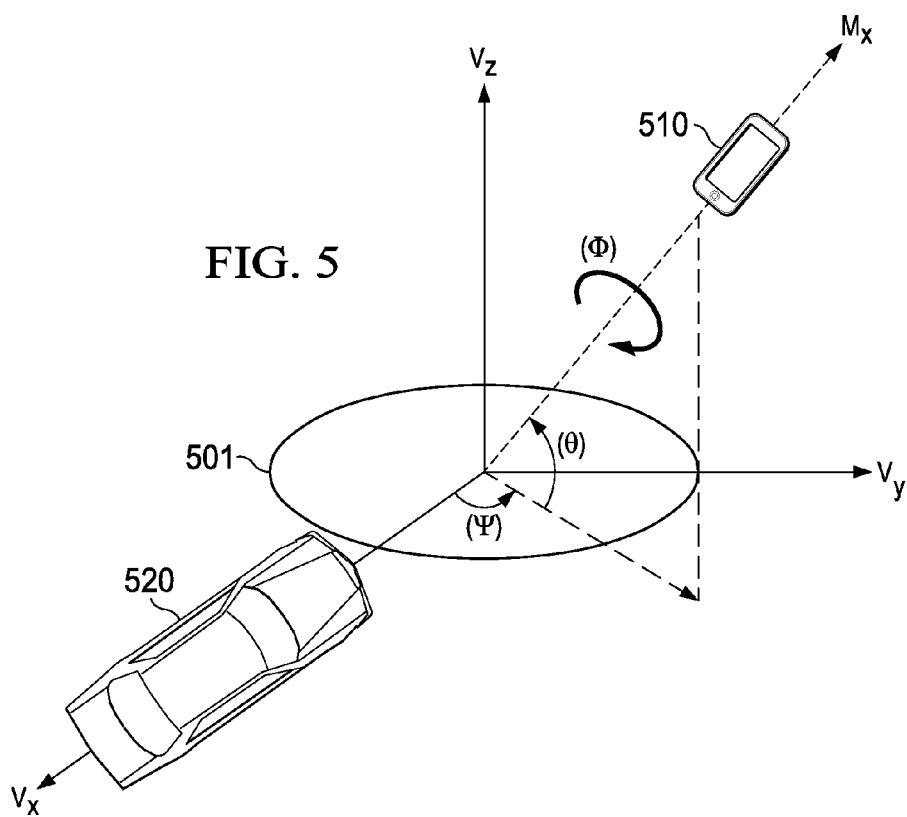
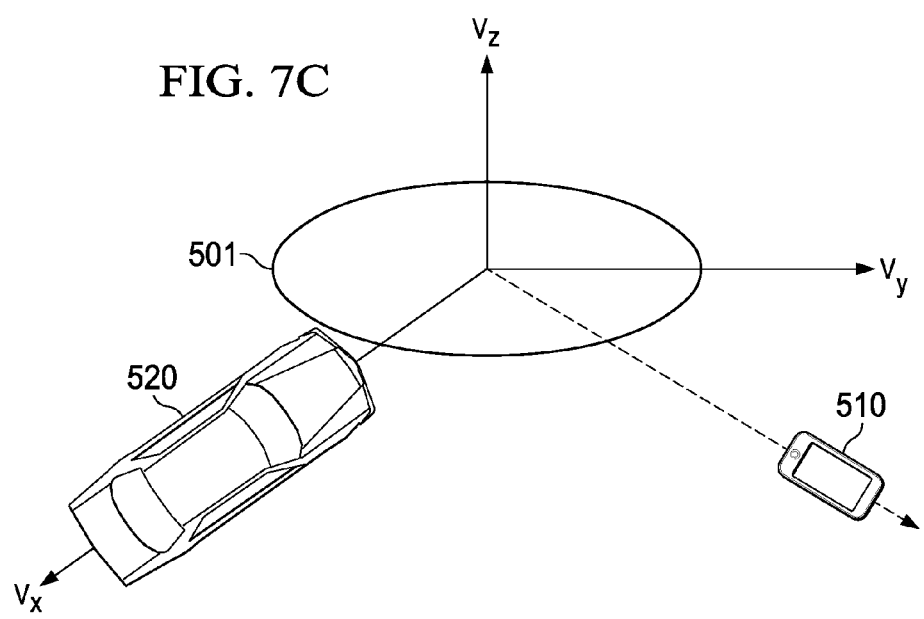

US 9,383,209 B2

UNDOCKING AND RE-DOCKING MOBILE DEVICE INERTIAL MEASUREMENT UNIT FROM VEHICLE

TECHNICAL FIELD

The present disclosure relates generally to navigation systems and more specifically to a method, system and apparatus for vehicular navigation using inertial sensors.

RELATED ART

In a vehicular navigation system, position and velocity information of the vehicle are often derived from a global navigation satellite system (GNSS) and/or from the inertial navigation system (INS). The INS uses inertial sensors to determine the vehicle's position and acceleration. Often, three dimensional inertial sensors (part of INS) comprising accelerometers and gyroscopes are deployed on the vehicle. The sensors are rigidly mounted on the vehicle such that the reference axes of the sensors are aligned to the vehicle geometry. Thus the, measurements along the sensors axes may be directly used for determining the position and velocity without alignment/re-alignment (for example, referencing the measurements from the sensor frame of reference to the vehicle geometry or with the drive direction of the vehicle).

SUMMARY

According to an aspect of the present disclosure, relative attitude between an inertial measurement unit (IMU), present on a mobile device, and the frame of reference of the vehicle carrying mobile device is estimated. The estimated relative attitude is used to translate the IMU measurement to the vehicle frame of reference to determine the velocity and position of the vehicle. As a result, the vehicle position and velocity are determined accurately in the event of undocking and re-docking of the mobile device from a docking system in the vehicle. In one embodiment, the relative attitude is estimated in terms of pitch, roll, and yaw angles.

According to another aspect, projection of the gravity vector on the IMU reference axes are used to determine the relative attitude when the vehicle is at rest. According to another aspect, when the vehicle is in motion, the relative attitude is estimated iteratively. As a result, the relative attitude may be determined without waiting for a rest state. The estimation error in the relative attitude due to vehicle acceleration is minimized by the iterations.

According to another aspect, the yaw angle is estimated when the vehicle is in motion after de-tilting the measurement. In one embodiment, an axis on which the acceleration dynamics are dominant is determined as the drive axis of the vehicle.

According to another aspect, the 0-π ambiguity is resolved by correlating the acceleration measurement and the angular velocity. In one embodiment, an acceleration derived from a GNSS is correlated with the acceleration from IMU to determine the drive direction.

Several aspects are described below, with reference to diagrams. It should be understood that numerous specific details, relationships, and methods are set forth to provide a full understanding of the present disclosure. One skilled in the relevant art, however, will readily recognize that the present disclosure can be practiced without one or more of the specific details, or with other methods, etc. In other instances, well-known structures or operations are not shown in detail to avoid obscuring the features of the present disclosure.

BRIEF DESCRIPTION OF DRAWINGS

FIG. 5 is a graph illustrating an example relative attitude of the IMU present on the mobile device with respect to the vehicle according to one embodiment.

FIG. 7C illustrates the effective position of the IMU present on the mobile device after de-tilting, according to one embodiment.

DETAILED DESCRIPTION

Figure 1:
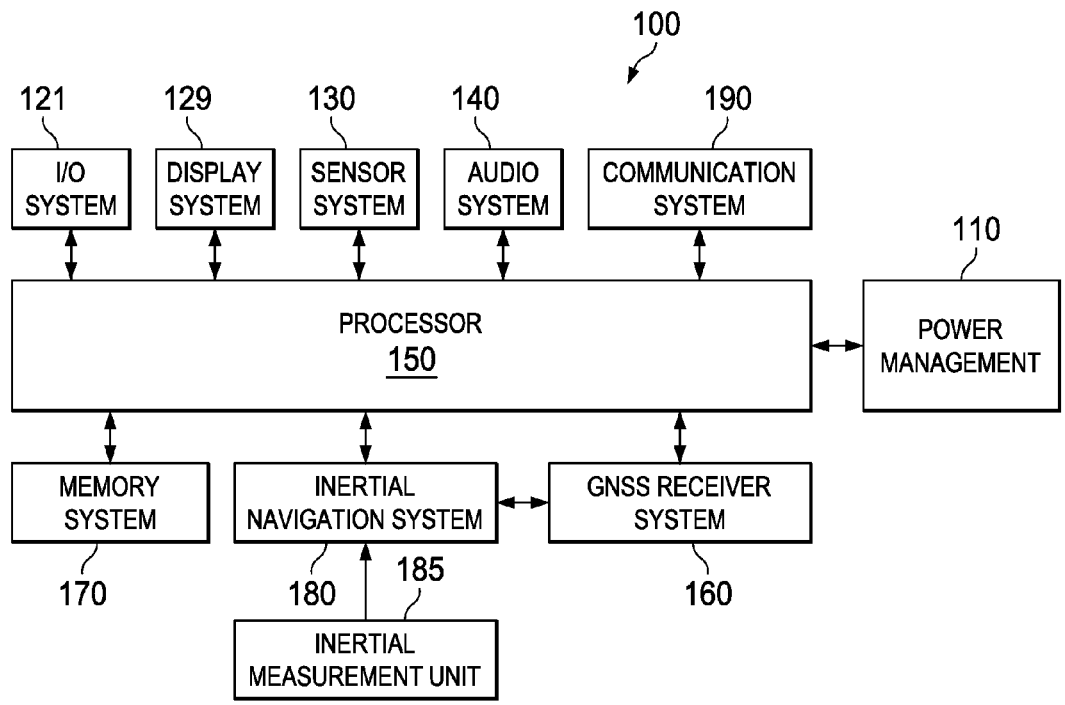
FIG. 1 is an example device in which various aspects of the present disclosure are seen.

FIG. 1 is an example device in which various aspects of the present disclosure are seen. As shown, the device 100, in one embodiment, comprises a power management unit 110, an input/output (I/O) system 121, a display system 129, a sensor system 130, an audio system 140, a processor 150, a GNSS receiver system 160, a memory system 170, an inertial navigation system 180, inertial measurement unit (IMU) 185 and a communication system 190. Each element is described in further detail below.

The power management unit 110 powers the device 100 for a desired operation. The power management unit 110 further comprises circuitry, integrated circuits and other functional modules to source power from internal/external power sources and to manage/distribute power to components 110 through 190 according to the power requirements of the respective components.

The I/O system 121 enables an exchange of information, data or commands to and from the device 100 with external systems or a user. The I/O system 121 comprises, but is not limited to, a keyboard/pad, touch screen, USB ports, wireless ports, smart card interface, mouse and/or other control devices. Each component in the I/O system 121 may be configured to operate as prescribed by one or more standards.

The display system 129 is configured to provide a visual output to the user of the device 100. The display system 129 comprises display devices such as, but not limited to, a display screen capable of displaying pictures, video and 3D pictures, 3D video, one or more LED status indicators, projectors, night vision lights, together with their associated drivers and ancillary components. The display system 129 receives information or data in a predetermined format and displays the data on one or more display devices.

The sensor system 130 is configured to determine the status and conditions in and around the device 100. The sensor system 130 comprises multiple sensors deployed throughout the device 100 to determine the condition around the device 100 by working in conjunction with one another or independently of one another. In one embodiment, the sensor system 130 is configured to determine the context under which the device 100 is being used. The sensor system 130 includes sensors such as, but is not limited to, sensors for measuring temperature, humidity, motion, torque, magnetic orientation and/or other parameters.

The audio system 140 manages the audio interface to device 100. The audio system 140 is configured to receive an audio signal from user or from other device (s) through one or more microphones (not shown). The audio signals generated within the device 100 such as sound alerts, etc., are provided by one or more speakers. In one embodiment, the audio system 140 includes other ancillary functionality and components (such as speech recognition) to enable the device 100 to recognize spoken user commands through a suitable audio interface.

The communication system 190 is configured to establish communication between the user device 100 and external system (s)/device (s) through one or more wireless communication channels. In one embodiment, the communication system 190 comprises functionality and components that enable the device 100 to transmit and receive data comprising voice, audio, video, short message, for example, according to one or more communication standards such as, but not limited to, Global System for Mobile Communications (GSM), Code division multiple access (COMA), General packet radio service (GPRS), wireless local area network (WLAN), and Bluetooth. Thus, the data from other components 110 through 185 is exchanged over one or more wireless channels through the communication system 190.

The memory system 170 is configured to store data and instructions (e.g., one or more programs) for execution by the processor 150. The memory system 170 provides a direct interface with other system in the device 100 or through the processor 150. The memory system 170 includes, but is not limited to, Read Only Memory (ROM), Random Access Memory (RAM), external memory disks, removable disks, and flash, caches and data cards.

The processor 150 is configured to execute instructions to perform various mathematical, signal processing and control operations. The processor 150 comprises of one or more processors or processor cores operating in conjunction to execute multiple instructions sequentially or simultaneously. The processor 150 comprises processors or cores customized to efficiently perform specific tasks, such as one or more Digital Signal Processing (DSP) cores, math co-processors etc. In one embodiment, the processor 150 is configured to perform operations related to systems 110 through 140 and 160 through 190 by executing a respective set of instructions (programs) stored, for example, in the memory system 170. Thus, the processor 150 lends processing power to systems 110 through 140 and 160 through 190 and operates as part of the respective system.

The GNSS receiver system 160 is configured to receive signals from multiple GNSS satellites and to perform signal processing, data processing and computations to generate an output comprising a position and velocity solution. In one embodiment, GNSS receiver system 160 employs processor 150 for processing the data. The GNSS receiver system 160 and INS system 180 exchange data and provide a unified velocity and position information for the navigation of the device 100.

Figure 2A:
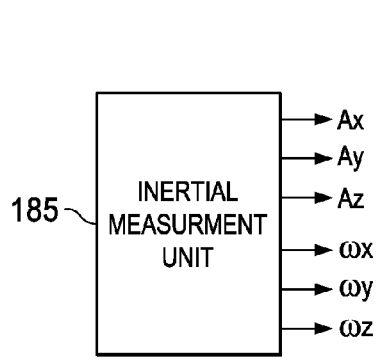
FIG. 2A is a block diagram illustrating the measurements from an example IMU.
Figure 2B:
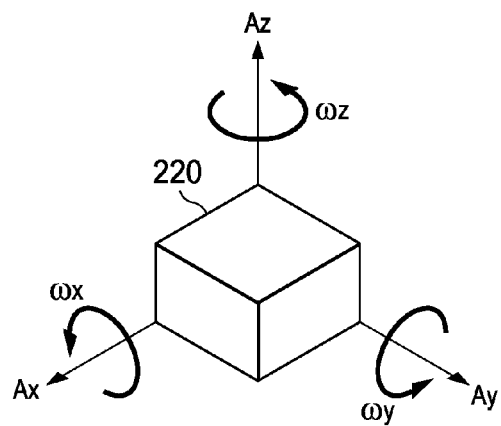
FIG. 2B illustrates an example microelectromechanical system (MEMS) sensors (IMU) reference axis. The MEMS sensors are shown referenced to axes (x, y, z).

The inertial measurement unit (IMU) 185 provides three dimensional acceleration and angular velocity measurements to the INS 180. In one embodiment, the IMU 185 employs MEMS sensors based three-dimensional accelerometer and three-dimensional gyroscopes to measure the acceleration and angular velocity, respectively. FIG. 2A is a block diagram illustrating the measurements from an example inertial measurement unit (IMU) 185. As shown there, the IMU 185 provides three dimensional accelerations (Ax, Ay, Az) and three dimensional angular velocities ($\omega x$, $\omega y$, $\omega z$) as output. The three accelerations (Ax, Ay, Az) and angular velocities ($\omega x$, $\omega y$, $\omega z$) are measured along the three reference axes (x, y, z) of the IMU. FIG. 2B illustrates example MEMS sensors (IMU) reference axis. The MEMS sensors are shown referenced to axes (x, y, z).

The INS 180 determines the position and velocity from a known (previous) position and velocity by using the acceleration and angular velocity measurements received from IMU 185.

Conventionally, MEMS sensors are rigidly fastened to a moving body (for example, a vehicle) such that the reference axes (x, y, z) of the three-dimensional accelerometer and three-dimensional gyroscopes devices are aligned with the geometry of the vehicle or to the drive direction of the vehicle. Thus, at the time of deployment of the IMU, the measurements are calibrated for any relative difference in alignment between the IMU reference axes and the vehicle reference axis (vehicle frame of reference). For example, x-axis of the IMU is aligned with the drive axis of the vehicle and y-axis with the lateral axis of the vehicle. A new position of the vehicle, after a time T with respect to a prior position is obtained by repeated integration of accelerations. Similarly, the orientation of the vehicle after the time T with respect to a prior orientation is obtained by repeated integration of the angular velocity, as well known in the art.

In one embodiment, the INS 180 is configured to determine the position and velocity of a vehicle when alignment of the references axes (x, y, z) of the IMU 185 with respect to that of the vehicle references axes are subjected to change (IMU 185 is not rigidly fastened to the vehicle). For example, the IMU 185 may be mounted within the device 100 configured to perform multiple functionalities such as mobile phone, personal computer, browser, video player, camera, TV, for example. Accordingly, the device 100 may not be rigidly fastened to the vehicle.

Figure 3:
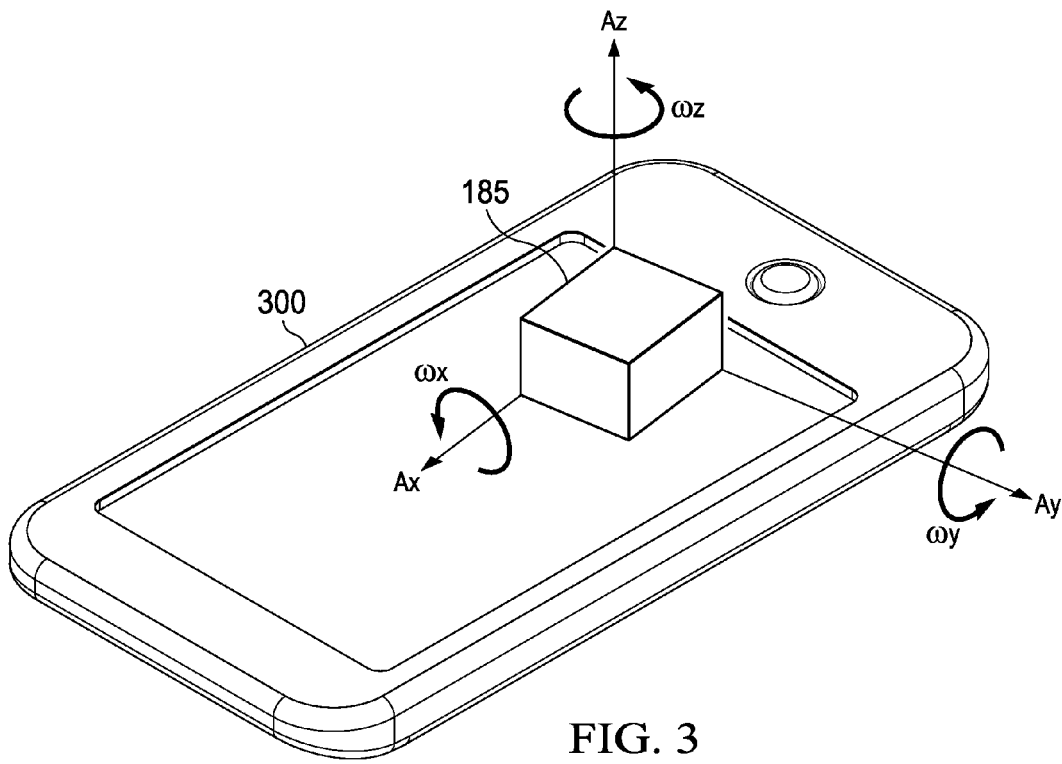
FIG. 3 illustrates an example use of device of FIG. 1 as mobile device employing the IMU.

FIG. 3 illustrates an example use of device 100 as a mobile device 300 employing the IMU 185. In one embodiment, the mobile device 300 may be mounted in a vehicle on a mobile docking system comprising multiple/flexible hinges (not shown). Alternatively, the mobile device 300 may be placed/docked in the vehicle on various other platforms such as seat, cup holder, dashboard etc. Thus, the spatial orientation (x, y, z) of the IMU 185 present on the mobile device 300 with respect to the vehicle (referred to as relative attitude) is subjected to change every time the mobile device 300 is undocked from and docked to the docking system. For example, the mobile device 300 may be used for performing other tasks during the motion of the vehicle and thus may be removed from the docking system. Later on, the mobile device 300 may again be docked to the docking system or any other place in the vehicle. Such events result in change of the relative attitude of IMU 185 present on the mobile device 300.

Accordingly, in one embodiment, INS 180 is configured to measure the relative attitude of the IMU present on the mobile device 300 with respect to the vehicle when the position of the mobile device is disturbed or changed from a prior position to a new position, for example, after mobile device 300 is used for other purpose. The INS 180 makes use of the measured relative attitude to translate the measurements received from the IMU 185 to the vehicular frame of reference. The translated measurements are used for determining the position and velocity of the vehicle. The manner in which the INS 180 determines the relative attitude of the IMU present on the mobile device 300 is described in further detail below.

Figure 4:
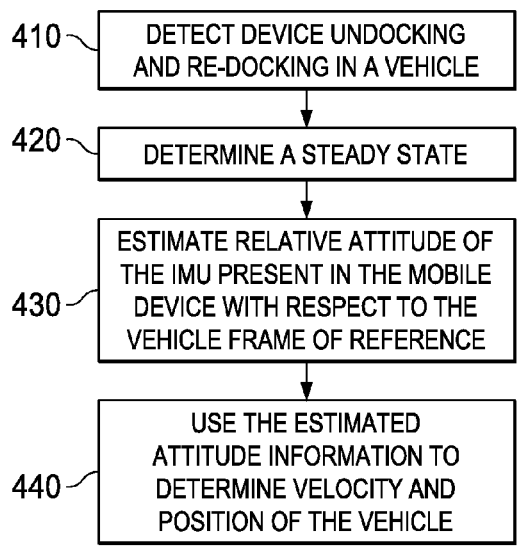
FIG. 4 is a block diagram illustrating the manner in which the INS determines the position and velocity of the vehicle in an embodiment.

FIG. 4 is a block diagram illustrating the manner in which the INS 180 determines the position and velocity of the vehicle in an embodiment. In block 410, the INS 180 detects the undocking of the mobile device 300 in a vehicle. The INS 180 may monitor the gyroscope and acceleration measurements for sudden spikes or disturbances. When a spike or momentary variations are detected in the INS 180, it determines that the mobile phone 300 is undocked or disturbed from its position in the vehicle. In other embodiment, the INS 180 may receive the undocking signal from other sensors or units (120-170) operative in device 100. In another embodiment, the INS 180 may detect steps or periodicity in the IMU 185 measurements (indicative of user walking with the mobile device). The step may be detected using any known step detection technique. The INS 180 determines the mobile device is undocked when the steps are detected.

In block 420, the INS 180 determines a steady state of the vehicle from the IMU 185 measurements. The steady state may comprise one of a rest state and a straight line motion of the vehicle. The INS 180 may monitor the gyroscope and acceleration measurements to determine the steady state of the vehicle. For example, INS may monitor the accelerometer and/or gyroscope measurements for a predefined time period. If the variation in measurements value is within a threshold for an entire time period, the INS 180 determines that the vehicle is in a state of rest. Similarly, if the variations in the gyroscope (s) measurements are within a predetermined threshold, the INS 180 determines that the vehicle is moving in a substantially straight line. Alternatively the INS 180 may receive signals from units 120-170 and may determine the steady state.

In block 430, the INS 180 estimates the relative attitude of the IMU 185 present on the mobile device 300 with respect to the vehicle. In one embodiment, the INS 180 may determine the relative attitude of the IMU 185 present on the mobile device 300 in terms of yaw, roll and pitch angles of the IMU 185 measured with respect to the vehicle frame of reference. In one embodiment, the vehicle frame of reference is determined by estimating the drive direction.

In block 440, INS 180 uses the estimated relative attitude information to determine velocity and position of the vehicle. In one embodiment, the INS 180 translates the measurements from IMU 185 on to the vehicle frame of reference based on the pitch, yaw, and roll values. The translated measurements are used to determine the velocity and position of the vehicle. The manner in which the INS 180 may determine the pitch, roll and yaw angles of the IMU present on the mobile device is described below in further detail.

FIG. 5 is a graph illustrating an example relative attitude of the IMU 185 present on the mobile device 510 with respect to the vehicle 520, according to one embodiment. In the graph, the roll angle ($\phi$), pitch angle ($\theta$) and yaw angle ($\psi$) represent an example relative attitude (spatial orientation) of the IMU 185 present on the mobile device 510 with respect to the vehicle 520 reference axes (Vx, Vy, Vz). The pitch ($\theta$) and roll ($\phi$) (together referred to as tilt) determine the alignment with respect to horizontal plane 501. The yaw ($\psi$) determines the alignment with reference to the drive axis (Vx) of the vehicle. In one embodiment, the INS 180 determines the tilt (the roll ($\phi$) and pitch ($\theta$)) and yaw ($\psi$) and translates the measurements from IMU 185 onto the vehicle reference axes for determining the position and velocity of the vehicle. The translation of roll, pitch and yaw on to the vehicle reference axes are referred to as de-roll, de-pitch and de-yaw respectively. In one embodiment, the INS 180 determines the roll ($\phi$) and pitch ($\theta$) first. The manner in which the roll and pitch may be determined is described in further detail below.

Figure 6:
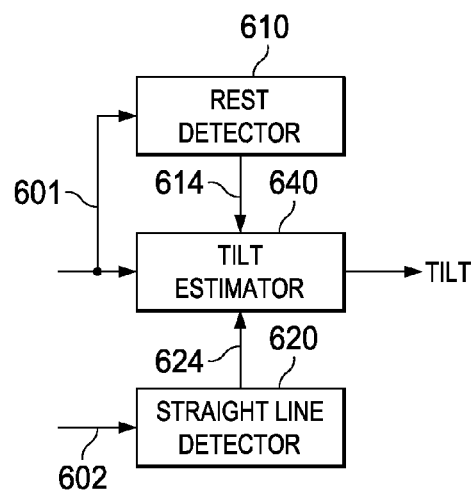
FIG. 6 is a block diagram illustrating an example implementation of the INS for determining the pitch and roll in one embodiment.

FIG. 6 is a block diagram illustrating an example implementation of the INS 180 for determining the pitch and roll in one embodiment. The block diagram is shown comprising a rest detector 610, straight line detector 620 and the tilt estimator 640. The rest detector 610 receives the three-dimensional acceleration measurements and/or three-dimensional angular velocity measurements on path 601 from IMU 185. The rest detector 610 is configured to send a signal (for example a logic low value) on path 614, representing the vehicle at rest, when the standard deviations of the acceleration measurements along one or more axis (x, y, z) and/or the standard deviations of the angular velocity measurements along one or more axis (x, y, z) are determined to be less than a threshold value (for example: 0.01 m/s^2 threshold for the acceleration measurements and 0.005 rad/s threshold for the angular velocity measurements) for a preset time period. In contrast, rest detector 610 is configured to send a different signal (for example a logic high value) on path 614 representing the vehicle is not at rest.

The straight line detector 620 receives the three-dimensional angular velocity measurements on path 602 from IMU 185. The straight line detector 620 is configured to send a signal (for example a logic low value) on path 624 representing the straight line motion of the vehicle when the standard deviations of the angular velocity measurements about one or more axis (x, y, z) are determined to be less than a threshold value (for example: 0.2 rad/s) for a preset time period. In contrast, the straight line detector 620 is configured to send a different signal (for example a logic high value) on path 624 representing the curved motion of the vehicle on non straight line motion of the vehicle.

The tilt estimator 640 estimates the tilt of the IMU present on the mobile device from the acceleration measurements received from the IMU 185. It may be appreciated that, when the vehicle is at rest, the acceleration measurements along the three axes (x, y, z) of the IMU are the projection of the gravity vector. The magnitude of the projection of the gravity vector on each axis depends on the attitude of the IMU with respect to the horizontal plane. Accordingly, the roll and pitch may be computed using relation 1 and 2 by making use of acceleration due to gravity g. In one embodiment, when the signal on path 614 represents the vehicle is at rest, the tilt estimator 640 estimates the tilt (pitch and roll) using the relation:

$$\hat{\theta}_M = \arcsin\left(\frac{a_M^x}{|a_M|}\right); \hat{\phi}_M = \operatorname{atan2}\left(\left[\begin{array}{c}-a_M^y\\a_M^z\end{array}\right]\right) \quad (1)$$

wherein $a_M^x$, $a_M^y$, $a_M^z$ represent the measured acceleration along x, y, and z axis of the IMU 185. The $\hat{\theta}_M$ and $\hat{\phi}_M$ represent the estimated pitch and roll of the IMU, wherein $|a_M|$ represents $|a_M| = \sqrt{(a_M^x)^2 + (a_M^y)^2 + (a_M^z)^2}$, $\arcsin(x) = \sin^{-1}(x)$ and $$a\tan2\left(\begin{bmatrix} x \\ y \end{bmatrix}\right) = \tan^{-1}(x/y),$$

wherein $$a_M = g \begin{bmatrix} \sin\theta_M \\ -\cos\theta_M \sin\phi_M \\ \cos\theta_M \cos\phi_M \end{bmatrix}, \quad (2)$$

wherein g representing the acceleration due to gravity.

In an alternative embodiment, tilt estimator 640 estimates the pitch and roll when the vehicle is not at rest and when the signal on path 524 represents a straight line motion of the vehicle. The tilt estimator 640 estimates the tilt iteratively using equation 1 and 2 when the signal on path 624 represents a straight line motion of the vehicle (the signal on path 614 may represent vehicle not at rest condition). The estimated pitch and roll in the first iteration may have a residual error due to vehicle acceleration. The iteration may be continued for number of times (for example 3 times) to reduce the residual error in the estimation of the pitch and roll.

For example, the pitch and roll estimation error in the first iteration may be represented as:

$$\theta_M^{Err} = \theta_M - \hat{\theta}_M \approx \pm a\tan2\left(\begin{bmatrix} \beta C_{\psi_R} \\ 1 \pm \beta \theta_1 \end{bmatrix}\right), \quad (3)$$

$$\phi_M^{Err} = \phi_M - \hat{\phi}_M \approx \pm a\tan2\left(\begin{bmatrix} \beta S_{\psi_R} \\ C_{\theta_M} \pm \beta(S_{\theta_M} C_{v_n} \pm \theta_1) \end{bmatrix}\right),$$

wherein $\theta_M^{Err}$ and $\phi_M^{Err}$ represent the pitch and roll estimation errors, respectively, $$\beta = \frac{|a_d|}{g},$$

$a_d$ represents the acceleration of the vehicle along the drive axis, $\theta_M$ and $\phi_M$ represents the true pitch and roll angles of the IMU, respectively, $\psi_R$ represents the relative yaw angle of the IMU with respect to the vehicle and $\theta_V$ represents the pitch angle of the vehicle (typically small) and $C_\theta = \cos\theta$; $S_\theta = \sin\theta$ It may be appreciated that, due to multiple iterations during the straight line motion, the residual error in the estimated pitch and roll can be contained within a value determined by β (~12° if β<0.2, but is typically less) irrespective of the true pitch and roll angles of the IMU. Though the iterative estimation of the pitch and roll are performed when the vehicle is determined to be travelling in straight line, the technique may be used to determine the pitch and roll (with same or more number of iteration) even when the signal on path 624 is otherwise.

Figure 7A:
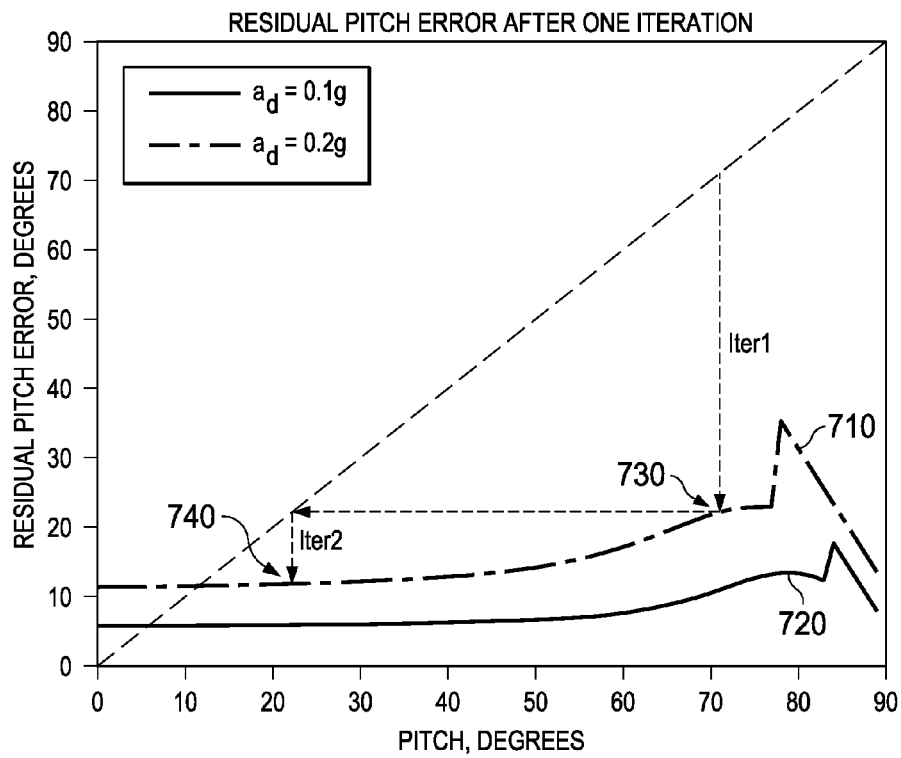
FIGS. 7A and 7B is a graph illustrating the reduction of residual error in the estimated pitch and roll angles due to multiple iterations, according to one embodiment.
Figure 7B:
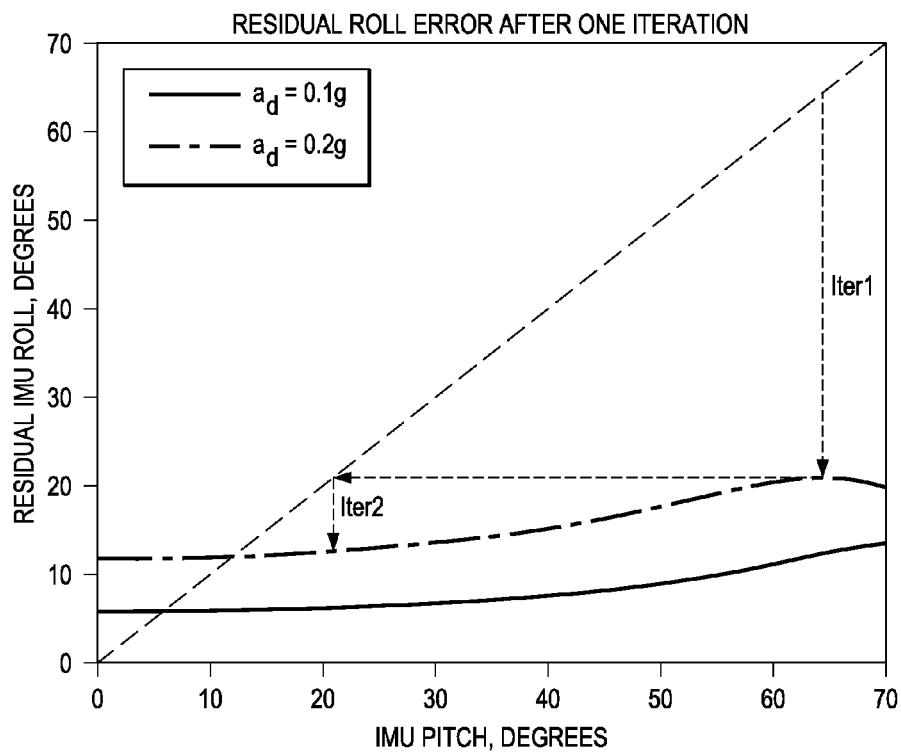

FIGS. 7A and 7B are the graphs illustrating the reduction of residual error in the estimated pitch and roll angles due to multiple iterations, according to one embodiment. In FIG. 7A, the x-axis represents the estimated pitch angle in degrees, the y axis represents the residual pitch error, curve 710 and 720 represent the acceleration of the vehicle in drive direction (in terms of g), the point 730 represent the residual pitch error after the first iteration when the vehicle's acceleration is 0.1 g. The point 740 represents the residual pitch error after the second iteration. It may be appreciated that, due to iteration, the residual error of the pitch (similarly for the roll as in FIG. 7B) reduces to within 0.1 g or 0.2 g depending on the acceleration profile of the vehicle. FIG. 7C illustrates the effective position of the IMU present on the mobile device after de-tilting, according to one embodiment. As shown there, the IMU on the mobile device 510 is aligned with the horizontal plane 501 after de-tilting (comparing with the attitude as shown in FIG. 5 before de-tilting). The manner in which the INS 180 estimates the yaw angle to determine the velocity and position of the vehicle is further described below.

Figure 8A:
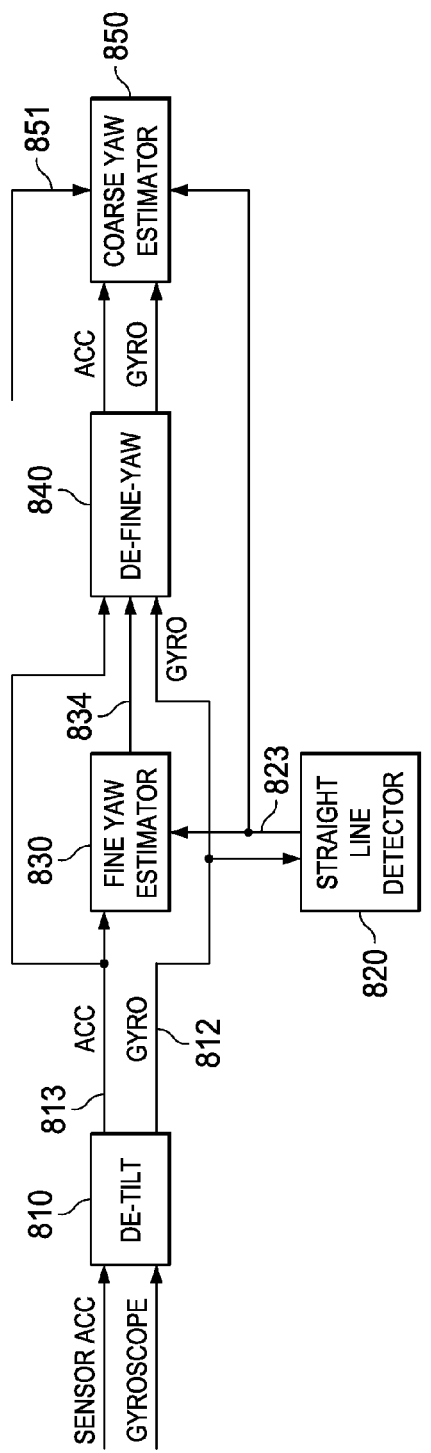
FIG. 8A is a block diagram illustrating the manner in which INS estimates the Yaw angle in one embodiment.

FIG. 8A is the block diagram illustrating the manner in which INS 180 estimates the yaw angle in one embodiment. The block diagram is shown comprising de-tilt block 810, straight line detector 820, fine yaw estimator 830, de-fine yaw block 840 and coarse yaw estimator 850. Each block is described in further detail below.

The de-tilting block 810 is configured to de-tilt the measurements received from the IMU. In one embodiment, the de-tilting block 810 may employ the iterative procedure described with reference to FIGS. 6 & 7 to estimate the tilt of the IMU present on the mobile device. The estimated tilt may be used to de-tilt the acceleration and angular velocity measurements.

In one embodiment, the de-tilted acceleration measurement vector is provided as:

$$a_N = \hat{P}_M^\gamma \hat{R}_M^\gamma a_M = \begin{bmatrix} C_{\theta_M} & 0 & S_{\theta_M} \\ 0 & 1 & 0 \\ -S_{\theta_M} & 0 & C_{\theta_M} \end{bmatrix}^\gamma \begin{bmatrix} 1 & 0 & 0 \\ 0 & C_{\phi_M} & -S_{\phi_M} \\ 0 & S_{\phi_M} & C_{\phi_M} \end{bmatrix}^\gamma a_M \quad (4)$$

wherein N represents Navigation frame, M represents measurement frame, $a_M$ represents the 3-dimensional acceleration measurement vector in the IMU frame of reference, $a_N$ represents the de-tilted acceleration measurement vector, $\hat{\theta}_M$ and $\hat{\phi}_M$ represent the estimated pitch and roll angles using the iterative technique described in above sections, and $[\bullet]^T$ represents the matrix transpose operation. Similarly, the angular velocity measurements are also de-tilted. The de-tilted acceleration and angular velocity measurements are provided on path 813 and 812, respectively.

The straight line detector 820 is configured to detect the straight line motion of the vehicle. In one embodiment, straight line detector 820 is configured to operate in a manner that is similar to the manner in which the straight line motion detector 620 operates. Accordingly, the straight line detector 820 provides a signal indicating the straight line motion on path 623. In an alternative embodiment, the straight line detector 820 may monitor the de-tilted gyroscope measurement of the z axis only received on path 812.

The fine yaw estimator 830 estimates the fine yaw angle when the signal on the path 823 indicates the straight line motion of the vehicle. In one embodiment, fine yaw estimator 830 determines the angle in the horizontal plane having dominant acceleration dynamics during the straight line motion of the vehicle. For example, fine yaw estimator 830 accumulates the acceleration measurement for a predefined time period. The fine yaw estimator may determine the distribution of the accumulated measurements.

Figure 8B:
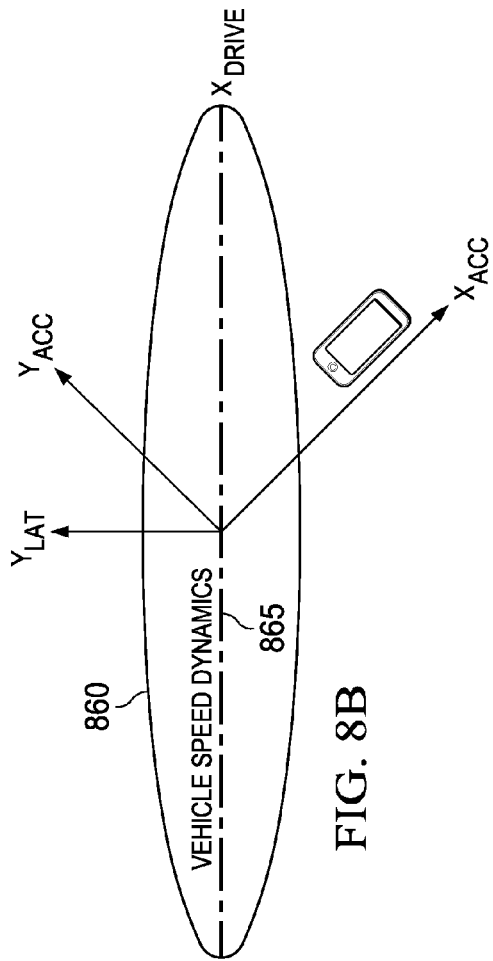
FIG. 8B illustrates an example distribution of the acceleration measurement during the straight line motion of the vehicle, according to one embodiment.

FIG. 8B illustrates an example distribution of the acceleration measurement during the straight line motion of the vehicle, according to one embodiment. As shown therein, an example set of measurements 860 over a time period is elliptically distributed on the horizontal plane. The dominant axis 865 of the elliptical distribution is determined to be aligned with the drive axis of the vehicle. Accordingly, the fine yaw estimator 830 equates the dominant axis of the acceleration dynamics to the drive axis of the vehicle, thus estimating the fine yaw angle. In one embodiment, the fine yaw estimator 830 estimates the yaw angle using variance maximising relation:

$$\hat{\psi} = \frac{1}{2} \tan^{-1}\left[\frac{-2\{R_{xy} - M_x M_y\}}{\{(R_{xx} - M_x^2) - (R_{yy} - M_y^2)\}}\right] \quad (3)$$

wherein, $\hat{\psi}$ represents the fine yaw angle, $R_{xx}$, $R_{yy}$ and $R_{xy}$ represents the auto-correlation and cross-correlation of the de-tilted acceleration measurements and are given by:

$$R_{xx} = \frac{\sum_{i=1}^{N}(a_{N_i}^x)^2}{N}, R_{yy} = \frac{\sum_{i=1}^{N}(a_{N_i}^y)^2}{N},$$

and $$R_{xy} = \frac{\sum_{i=1}^{N} a_{N_i}^x a_{N_i}^y}{N},$$

respectively, and $M_x$ and $M_y$ represent the mean of the de-tilted acceleration measurements given by:

$$M_x = \frac{\sum_{i=1}^{N} a_{N_i}^x}{N}$$

and $$M_y = \frac{\sum_{i=1}^{N} a_{N_i}^y}{N},$$

respectively.

The estimated fine yaw angle is provided on path 834. The de-fine yaw block 840 corrects/calibrates the IMU 185 measurements using the fine Yaw ($\psi$) angle information received on path 834. However, the estimated drive direction on the drive axis may depend on the characteristic of the accumulated measurement. For example, if larger numbers of accumulated measurements are collected during the application of brake, the estimated vehicle drive direction by the fine yaw estimator may be opposite to the drive direction. Thus, the drive direction estimated by the fine Yaw estimator 840 has ambiguity (often referred to as 0 or π ambiguity).

The coarse yaw estimator 850 resolves this ambiguity in the direction of the drive axis and determines the drive direction. In one embodiment, the coarse yaw estimator 850 correlates the de-tilted angular velocity measurements along the z-axis with the de-tilted lateral acceleration measurements during turns (for example, the correlation is computed when the angular velocity measurement is greater than some threshold) to determine the coarse yaw estimation when the correlation is positive, the ambiguity is determined as 0 degrees. On the other hand if the correlation is negative, the ambiguity is determined to be 180 degrees or π. In another embodiment, the acceleration measurement along the drives axis (with ambiguity) is correlated with GNSS based acceleration estimates.

In one embodiment, the coarse yaw estimator 850 receives the GNSS computed acceleration from GNSS system 160. For example, the GNSS system or processor 150 may estimate the GNSS acceleration by differentiating GNSS velocity from the GNSS system 160. The estimated GNSS acceleration (in the drive direction of the vehicle) is provided on path 851 to the coarse yaw estimator 850.

The coarse yaw estimator 850 correlates the GNSS acceleration and the de-fine yaw corrected acceleration measurement from IMU 185. If the correlation is positive, the ambiguity is determined as 0 degrees. On the other hand, if the correlation is negative, the ambiguity is determined to be 180 degrees or π. In one embodiment the coarse yaw estimator 850 uses the maximum likelihood relation:

$$\hat{S}_{ML} = \text{sign}\left(\sum_i a_i^D a_i^G - \frac{\left(\sum_i a_i^D\right)\left(\sum_i a_i^G\right)}{N}\right) \quad (4)$$

wherein, the sign function representing "sign of", $a_1^D$ and $a_1^G$ represents the de-tilted $i^{th}$ acceleration sample along the drive axis from 840 and estimated acceleration sample from GNSS 160 provided on path 851, respectively, and N represents the total number of samples. When $\hat{S}_{ML}$ value is positive, the coarse yaw correction is determined to be 0 degrees. The coarse yaw correction is determined to be 180 degrees otherwise. As a result, the coarse yaw estimation may be performed without waiting for a curved motion of the vehicle.

While various examples of the present disclosure have been described above, it should be understood that they have been presented by way of example, and not limitation. Thus, the breadth and scope of the present disclosure should not be limited by any of the above-described examples, but should be defined in accordance with the following claims and their equivalents.

What is claimed is:

1. A method comprising:
   detecting an undocking and a re-docking of a mobile device, which includes an inertial measurement unit, from a vehicle, the inertial measurement unit employing sensors including three-dimensional accelerometers and three-dimensional gyroscopes to measure the acceleration and angular velocity;
   determining a steady state of the vehicle from inertial measurements received from the inertial measurement unit;
   estimating a relative attitude of the inertial measurement unit with respect to a frame of reference of the vehicle;
   translating the estimated relative attitude to form translated inertial measurements; and
   determining at least one of a velocity and a position of the vehicle using the translated inertial measurements;
   the estimating including estimating the relative attitude as roll, pitch and yaw angles made by the inertial measurement unit relative to the vehicle frame of reference;
   the estimating including estimating the pitch and the roll by a projection of a gravity vector on a first reference axis of the IMU inertial measurement unit when the steady state is a rest state of the vehicle, wherein the first reference axes are x, y and z axis in a Cartesian co-ordinate system; and
   the estimating including estimating the pitch and the roll using relation:

$$\hat{\theta}_M = \arcsin\left(\frac{a_M^x}{|a_M|}\right); \hat{\phi}_M = \mathrm{atan2}\left(\begin{bmatrix} -a_M^y \\ a_M^z \end{bmatrix}\right)$$

wherein $a_M^x$, $a_M^y$, $a_M^z$ represent the measured acceleration along x, y, and z axes, wherein the $\hat{\theta}_M$ and $\hat{\phi}_M$ represent the estimated pitch and roll of the IMU $$|a_M| = \sqrt{(a_M^x)^2 + (a_M^y)^2 + (a_M^z)^2},$$

and $$a_M = g \begin{bmatrix} \sin\theta_M \\ -\cos\theta_M \sin\phi_M \\ \cos\theta_M \cos\phi_M \end{bmatrix},$$

respectively, and wherein g represents the gravity vector.

2. The method of claim 1, including estimating pitch and the roll iteratively by repeated projection of the gravity vector on the first reference axis when the steady state is a straight line motion of the vehicle.

3. The method of claim 2, including de-rolling and de-pitching the inertial measurements to form de-tilted inertial measurements, the tilted inertial measurements including de-tilted acceleration measurements, and de-tilted angular velocity measurements.

4. The method of claim 3, including:
accumulating the de-tilted acceleration measurement for a predefined time period when the vehicle is in a straight line motion;
determining a dominant axis in the horizontal plane having dominant de-tilted acceleration measurement dynamics; and
equating the dominant axis to the drive axis of the vehicle.

5. The method of claim 4, in which the determining a dominant axis includes determining the yaw angle using a relation:

$$\hat{\psi} = \frac{1}{2}\tan^{-1}\left[\frac{-2\{R_{xy} - M_x M_y\}}{\{(R_{xx} - M_x^2) - (R_{yy} - M_y^2)\}}\right]$$

where, $\hat{\psi}$ represents the fine yaw angle, $R_{xx}$, $R_{yy}$ an auto-correlation and $R_{xy}$ represents cross-correlation of the de-tilted acceleration measurement, and $M_x$ and $M_y$ represents a mean of the de-tilted acceleration measurements.

6. The method of claim 5, including correlating the de-tilted angular velocity measurement with the de-tilted acceleration measurement during a turn to form a first correlation value and determining drive direction as positive dominant axis when the correlation is positive.

7. The method of claim 5, including correlating the velocity computed from a GNSS system and a de-yawed acceleration measurement to form a second correlation value, and determining drive direction as positive dominant axis when the correlation is positive.

8. A mobile device for use with a vehicle, the mobile device comprising:
an inertial measurement unit configured to provide inertial measurements along a first reference axes, the inertial measurement unit employing sensors including three-dimensional accelerometer and three-dimensional gyroscopes to measure the acceleration and angular velocity;
a detector configured to detect a steady state of the vehicle from the inertial measurements;
an estimator configured to estimate a relative attitude of the inertial measurement unit with respect to a frame of reference of the vehicle;
a translator configured to translate the relative attitude to form translated inertial measurements;
a navigator configured to determine at least one of a velocity and a position of the vehicle using the translated inertial measurements;
the relative attitude is estimated as roll, pitch and yaw angles made by the inertial measurement unit relative to the vehicle frame of reference;
the estimator is further configured to estimate pitch and roll by a projection of the gravity vector on a first reference axis of the inertial measurement unit when the steady state is a rest state of the vehicle, the first reference axes are the x, y and z axes in a Cartesian co-ordinate system; and
the pitch and the roll are estimated using a relation:

$$\hat{\theta}_M = \arcsin\left(\frac{a_M^x}{|a_M|}\right); \hat{\phi}_M = \mathrm{atan2}\left(\begin{bmatrix} -a_M^y \\ a_M^z \end{bmatrix}\right)$$

where $a_M^x$, $a_M^y$, $a_M^z$, represent the measured acceleration along the x, y, and z axis, respectively, $\hat{\theta}_M$ and $\hat{\phi}_M$ represent the estimated pitch and roll of the IMU, $$|a_M| = \sqrt{(a_M^x)^2 + (a_M^y)^2 + (a_M^z)^2}, \text{ and}$$

$$a_M = g \begin{bmatrix} \sin\theta_M \\ -\cos\theta_M \sin\phi_M \\ \cos\theta_M \cos\phi_M \end{bmatrix},$$

respectively, and g represents the gravity vector.

9. The mobile device of claim 8, in which the estimator is further configured to estimate pitch and the roll iteratively by repeated projection of the gravity vector on the first reference axis when the steady state is a straight line motion of the vehicle.

10. The mobile device of claim 9, in which the translator is further configured to de-roll and de-pitch the inertial measurement to form de-tilted inertial measurements, the tilted inertial measurements include de-tilted acceleration measurements and de-tilted angular velocity measurements.

11. The mobile device of claim 10, including:
a memory configured to store the de-tilted acceleration measurement for a predefined time period when the vehicle is in a straight line motion; and
a data processor configured to determine a dominant axis in the horizontal plane having dominant de-tilted acceleration measurement dynamics, and the estimator is configured to equate the dominant axis to the drive axis of the vehicle.

12. The mobile device of claim 11, in which the yaw angle is determined using a relation:

$$\hat{\psi} = \frac{1}{2}\tan^{-1}\left[\frac{-2\{R_{xy} - M_x M_y\}}{\{(R_{xx} - M_x^2) - (R_{yy} - M_y^2)\}}\right],$$

where $\hat{\psi}$ represents the fine yaw angle, $R_{xx}$, $R_{yy}$ an auto-correlation and $R_{xy}$ represents cross-correlation of the de-tilted acceleration measurement, and $M_x$ and $M_y$ represent the mean of the de-tilted acceleration measurements.

13. The mobile device of claim 12, in which the estimator is further configured to correlate the de-tilted angular velocity measurement with the de-tilted lateral acceleration measurement during a turn to form a first correlation value and to determine positive dominant axis as drive direction when the correlation is positive.

14. The mobile device of claim 12, in which the estimator is further configured to correlate a velocity computed from a GNSS system and a de-yawed acceleration measurement to form a second correlation value, and to determine positive dominant axis as drive direction when the correlation is positive.

15. The mobile device of claim 12, in which the detector is further configured to detect at least one of spikes in the inertial measurements, steps in the inertial measurements, or disturbance in the inertial measurements to determine the event of undocking of the mobile device from the docking systems.

* * * * *